(12) United States Patent
Robertson et al.

(10) Patent No.: US 6,496,740 B1
(45) Date of Patent: Dec. 17, 2002

(54) TRANSFER CONTROLLER WITH HUB AND PORTS ARCHITECTURE

(75) Inventors: Iain Robertson, Cople (GB); David Hoyle, Bedford, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/543,870

(22) Filed: Apr. 6, 2000

(30) Foreign Application Priority Data

Apr. 21, 1999 (GB) ............................................. 9909196

(51) Int. Cl.[7] .............................................. G05B 11/01
(52) U.S. Cl. ................................ 700/20; 700/2; 700/5; 700/7; 700/19; 700/11; 700/12; 710/2; 710/22; 710/23; 710/26; 710/28; 710/107; 712/34; 712/36; 712/38
(58) Field of Search ............................ 700/2–5, 7, 26, 700/25, 19–20, 11–12; 710/2, 22, 23, 26, 28, 33, 107, 119, 14, 48, 308, 54; 712/36, 35, 34, 38

(56) References Cited

U.S. PATENT DOCUMENTS

| | | | | |
|---|---|---|---|---|
| 4,979,170 A | * | 12/1990 | Gilhousen et al. | 370/321 |
| 5,379,320 A | * | 1/1995 | Fernandes et al. | 375/141 |
| 5,404,522 A | * | 4/1995 | Carmon et al. | 709/107 |
| 5,634,076 A | * | 5/1997 | Garde et al. | 709/212 |
| 5,678,064 A | * | 10/1997 | Kulik et al. | 710/28 |
| 5,748,945 A | * | 5/1998 | Ng | 703/23 |
| 5,812,873 A | * | 9/1998 | Ryu | 341/143 |
| 6,092,173 A | * | 7/2000 | Sasaki et al. | 711/120 |
| 6,195,724 B1 | * | 2/2001 | Stracovsky et al. | 710/107 |
| 6,240,458 B1 | * | 5/2001 | Gilbertson | 709/232 |
| 6,253,260 B1 | * | 6/2001 | Beardsley et al. | 710/20 |
| 6,260,099 B1 | * | 7/2001 | Gilbertson et al. | 710/240 |
| 6,272,564 B1 | * | 8/2001 | Garrett et al. | 710/22 |

\* cited by examiner

*Primary Examiner*—Ramesh Patel
(74) *Attorney, Agent, or Firm*—Robert D. Marshall; W. James Brady, III; Frederick J. Telecky, Jr.

(57) ABSTRACT

The transfer controller with hub and ports (TCHP) performs the task of communication throughout an entire system in a centralized function. A single hub (435) tied to multiple ports (440, 447, 450, 452) by a central pipeline is the medium for all data communications among DSP clusters (455), external devices, and external memory. A transfer request queue manager (420) receives, prioritizes and queues data transfer requests. Each data port includes an identically configured interior interface (901) connected to the hub (435) and an exterior interface (902) configured for a target external memory/device connected to the port. The interior interfaces of all ports are clocked at a common internal frequency, while the exterior interfaces are clocked at the frequency of the external memory/device connected to the port.

13 Claims, 7 Drawing Sheets

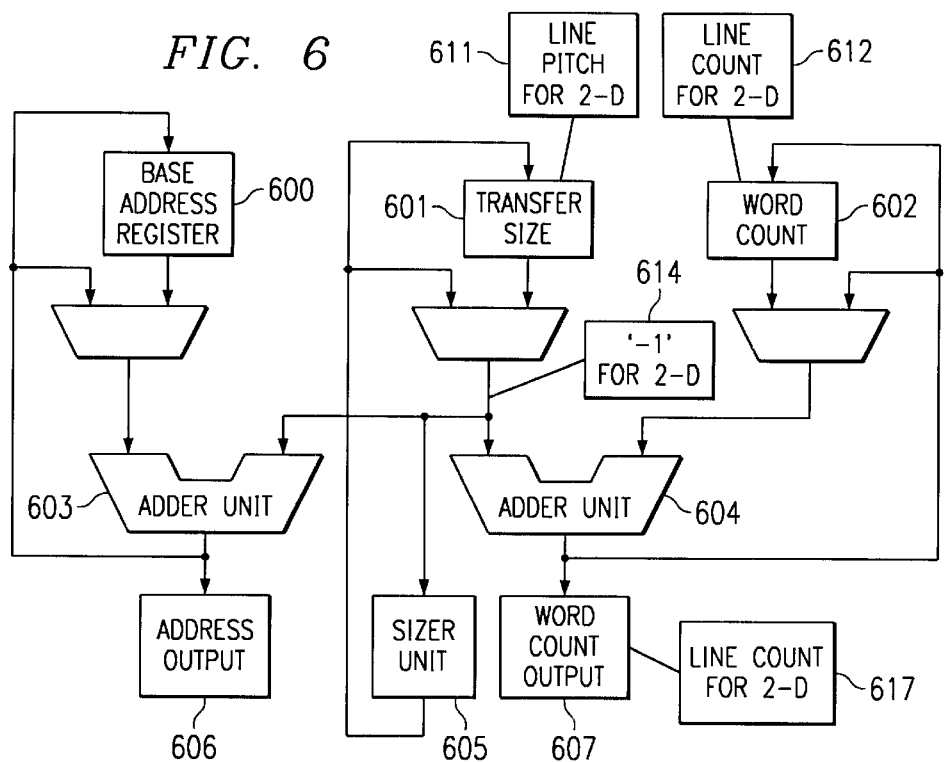
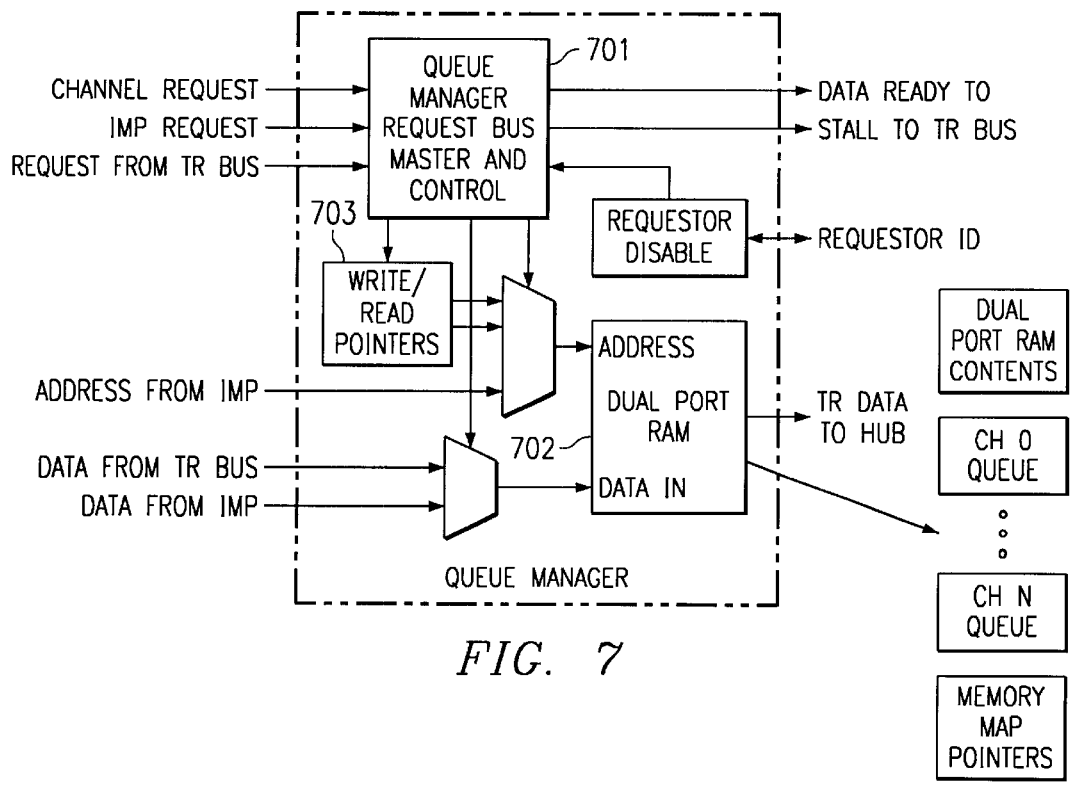

TRANSFER CONTROLLER WITH HUB AND PORTS ARCHITECTURE

This application claims priority under 35 USC §119 of British Application Number 99 09196.9, filed Apr. 21, 1999, in the United Kingdom Patent Office.

BACKGROUND OF THE INVENTION

1. Field of the Invention

General purpose multiprocessors, with a few exceptions, generally fall in a class of architectures which have been classified as 'multiple instruction stream, multiple data stream processors', sometimes labeled MIMD multiprocessors. This classification can be further divided into two sub-classes. These are:

(1) centralized shared memory architectures illustrated in FIG. 1 and (2) distributed memory architectures illustrated in FIG. 2.

In FIG. 1, the shared main memory functional block 100 may be accessed by any one of the four processors 101, 102, 103, 104 shown. The external memory interface block 105 includes several possible sub-blocks among which are DRAM controller, SRAM controller, SDRAM controller, external disc memory interface, external ROM interface, RAMBus, or synchronous link DRAM interface and all other external memory devices.

The XDMA (external direct memory access) interface 106 is the interface to fully autonomous external devices. The external I/O interface 107 includes all other external interface: fast serial I/O port controller, parallel I/O interface, PCI bus controller, and DMA (direct memory access interface) controller are examples.

In FIG. 2 in distributed memory multi-processor machine, the main memory is distributed among processor nodes 201, 202, 203, 204, 205, 206, and 207 as shown and all external memory interfaces are accomplished through the interconnection network 210. External direct memory access is centralized at the XDMA port 208 which includes the XDMA control and I/O interface functions. Direct memory access (DMA) is distributed at each processor I/O Node or could be centralized as shown in the DMA functional block 209.

Interchange of data in FIG. 2, from one processor node to another and from any processor node to external devices and memory is exceedingly complex and collisions caused by conflicting data transfer requests are frequent.

Systems having perhaps two to four processors might be of either the centralized shared memory type or the distributed memory type, but as the required processor count increases, the advantages of a distributed memory architecture become prominent. This is because a centralized shared memory 100 cannot support the bandwidth requirements of the larger number of processors.

The complexity of the interconnection network required in a distributed memory multiprocessor is one of elements of the cost of surmounting the bandwidth limitations of the shared memory system. Other elements of cost are addressing complexity and additional coherency and protocol requirements. The disadvantage of a distributed memory system is that this complex interconnection network has a formidable task, the communication of data between each and any pair of processors, which results in higher latency than the single, shared memory processor architecture.

Conventional digital signal processors (DSP) having a single processor typically include direct memory access, a method of memory access not requiring CPU activity, and conventionally this is accomplished by a 'DMA' functional block, which includes an I/O device and a controller function. This functional feature allows interface of external devices with CPU, internal memory, external memory, and other portions of the chip.

Direct memory access is usually the term used for external device interface, but external DRAM memory could be considered as simply another external device which has more demanding throughput requirements and would operate at a somewhat higher frequency than the typical frequency of a simple I/O device. The DMA interface is the communication link which relieves the central processing unit (CPU) from servicing these external devices on its own, preventing with loss of many CPU cycles which would be consumed in a direct CPU-external device interface.

Digital signal processing (DSP) differs significantly from general purpose (GP) processing performed by microcontrollers and microprocessors. One key difference is the typical strict requirement for real time data processing. For example, in a modem application, it is absolutely required that every sample be processed. Even losing a single data point might cause a DSP application to fail. While processing data samples may still take on the model of tasking and block processing common to general purpose processing, the actual data movement within a DSP system must adhere to the strict real-time requirements of the system.

As a consequence, DSP systems are highly reliant on an integrated and efficient DMA (direct memory access) engine. The DMA controller is responsible for processing transfer requests from peripherals and the DSP itself in real time. All data movement by the DMA must be capable of occurring without central processing unit (CPU) intervention in order to meet the real time requirements of the system. That is, because the CPU may operate in a software tasking model where scheduling of a task is not as tightly controlled as the data streams that the tasks operate on, the DMA engine must sustain the burden of meeting all real time data stream requirements in the system.

There are several approaches that may be taken to meet these requirements. The following is a brief summary of the conventional implementations of DMA engines, and their evolution into the unique I/O solution provided by the present invention, the transfer controller with hub and ports (TCHP) architecture.

2. Description of the Related Art

The conventional DMA engine consists of a simple set of address generators which can perform reads and writes of some, or perhaps all, addresses within a DSP system. The address generation logic is normally implemented as a simple counter mechanism, with a reload capability from a set of DSP memory-mapped registers. A typical use of a DMA controller is for the DSP to load the counters with a starting address and a count, representing the amount of data to transfer. The DSP must supply both the source and destination addresses for the transfer. Once this information has been loaded into the counters, the DSP can start the DMA via a memory mapped register write. The DMA engine then begins performing read and write accesses to move the requested data without further DSP intervention. The DSP is free to begin performing other tasks.

As the DMA performs read and writes to the source and destination locations, the addresses are incremented in each counter while the count is decremented. Once the count reaches zero, the transfer is complete and the DMA terminates. Most DMAs include a mechanism of signaling this 'done' state back to the CPU via a status bit or interrupt. In general the interrupt method is preferred because it does not require a polling loop on the DSP to determine the completion status.

The simplest DMAs provide for basic single dimensional linear transfers. More advanced DMA engines may provide multi-dimensionality, indexed addressing, and reverse and fixed addressing modes.

As DSP cores have reached higher and higher performance, applications have opened up which can utilize the increased processing capability. Along with this however, has come the need for higher speed, and higher complexity DMA engines. For example, if a previous generation DSP only had enough processing power for a single audio channel, a single DMA engine might be sufficient. However, when a new DSP architecture is introduced with ten times this performance, now multiple channels of audio could be processed. However, the DSP processing alone is not sufficient to provide the additional channel capacity. The DMA must also be enhanced to provide the data movement functions required for the multiple channels.

There are several features which are becoming increasingly common to DMAs which have attempted to address the issue of providing higher performance. The first is the inclusion of more DMA channels. A single DMA channel basically consists of all the hardware required to process a single direct memory access, and will generally include at least a source and destination address register/counter, a byte count register/counter, and the associated control logic to allow it to perform basic read and write operations.

Depending on the addressing modes which the DMA support additional logic may also be required. In a multi-channel DMA, the logic for a single channel is generally just replicated multiple times to provide increased channel capability. In addition to the multiple instantiations of the channels, a multi-channel DMA must also include some arbitration logic to provide time division access by all the channels to the memory/peripherals which the channels can address.

Conventional DMAs include anywhere from 2 to 16 channels. The advantage of additional channels is that each channel can contain parameters for a specific type of transfer. The DSP sets up each channel in advance, and does not have to reload the DMA registers each time a new transfer has to be done, the way it would have to if only a single channel existed.

A second enhancement to conventional DMA engines is the ability for peripherals to start DMAs autonomously. This function is generally provided in a manner analogous to a DSP interrupt. The DSP is still responsible for setting up the DMA parameters initially, however, the channel performs the reads and writes at the request of a peripheral rather than requiring the DSP to start it off. This is particularly advantageous in systems where there are a large number of data streams to process, and it would not be efficient to have the DSP task switching from one stream to the next all the time. This is also a significant advantage when the data streams may be of significantly different types and speeds. Because each DMA channel can be programmed independently, the parameters for each transfer type can be adjusted accordingly.

The final optimization to be noted here, which highly sophisticated conventional DMA controllers can include, is the option of dynamic reloading. This process allows a DMA channel to reload its own parameters from a set of registers without requiring CPU intervention. In some systems, the reload can even occur directly from memory, which can create a highly powerful DMA mechanisms due to the expanded storage capacity. Because the reload values may be set up by the DSP, many complicated DMAs may be effectively linked to one another. That is, the completion of one DMA parameter set forces the reload of another set, which may be of a completely different type than the first.

Through intelligent setup of the parameters, the DMAs can perform many complex functions not directly supported by the DMA hardware. Dynamic reload is once again very important in systems where many data streams are handled via the DMA, as it removes the requirement from the DSP to reload each of the DMA channels.

While DMAs are a powerful tool in a DSP system, they also have their limitations. The fundamental limitation of a conventional DMA engine is that adding additional channel capacity requires additional hardware (in general, a replication of a complete channel). Some optimizations can be made in this area, such as sharing registers between multiple channels, but in general, the following rule holds: N-channels costs N times as much as a single channel.

This basic principle led to the initial development of the Transfer Controller (TC). The TC is a unique mechanism which consolidates the functions of a DMA and other data movement engines in a DSP system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design to change. In a distributed address system (multi-channel DMA for example), all instances of the DMA channels would change, as would the DSP memory controllers.

Fundamental disadvantages of the consolidated model are its inherent bottlenecking and challenge to higher clock rates. Additionally, there is in general an added complexity associated with moving to a consolidated address model, just because the single module is larger than any of the individual parts it replaces.

TMS320C80/TMS320C82 Transfer Controller

The first transfer controller (TC) module was developed for the TMS32OC80 DSP from Texas Instruments. This TC is the subject of the following U.S. Pat. No. 5,560,030 entitled 'Transfer Processor with Transparency' dated Sep. 24, 1996. This TC consolidated the DMA function of a conventional controller along with the address generation logic required for servicing cache and long distance transfers (this function is referred to as direct external access) from four DSPs and a single RISC (reduced instruction set computer) processor.

The TMS320C80 TC architecture is fundamentally different from a DMA in that only a single set of address generation and parameter registers is required, rather than multiple sets for multiple channels. The single set of registers, however, can be utilized by all DMA requesters. DMA requests were posted to the TC via set of encoded inputs at the periphery of the device. Additionally, each of the DSPs can submit DMA requests to the TC. The external encoded inputs which are 'externally initiated packet transfers' are referred to as XPTs, while the DSP initiated transfers are referred to as 'packet transfers' PTs. The reduced instruction set computer (RISC) processor could also submit PT requests to the TC.

When a PT (or XPT) request is made to the TC, it is prioritized according to a fixed scheme. XPTs are the highest, since they most often require immediate servicing. Nevertheless, PT service involved the TC reading a fixed location in internal memory to determine the point at which to access the parameters for the transfer. This location is termed the 'linked list start address'. Transfer parameters include the basic source and destination addresses, along with byte counts as in a conventional DMA.

However, the TMS320C80 TC was significantly advanced in that it included support for many more transfer modes. These modes totalled over 130 in all, and comprehended up to three dimensions. Options included such features as lookup table transfers, offset guided transfers, walking through memory in an indexed fashion, and reverse mode addressing.

Further enhancements such as parameter swapping between source and destination allowed a single set of parameters to be used for data capture, and then return to the location from which it was originally fetched, a feature found very useful in DSP processing routines. The TMS320C80 TC PT's also supported an infinite amount of linking such that software linked lists of PTs could be generated up to the available memory in the system.

The TMS320C80 TC additionally provided the main memory interface for the device. A single 64-bit datapath external interface was provided, which could talk to SDRAM, DRAM, VRAM, SRAM, and ROM devices. Programmable refresh control for dynamic memory was also provided by the TC. The external interface provided dynamic page and bus sizing, and single cycle throughput. At 60 MHz, up to 480 MB/s burst transfer rates were achievable. In real applications, a sustainable rate of <420 MB/s was possible.

On the internal side of the TMS320C80 TC, access to the multiple DSP node memories was provided via a large crossbar, which included a 64-bit datapath to all on chip memories. Crossbar access was arbitrated in a round-robin fashion between the DSPs, RISC processor, and TC on a cycle-by-cycle basis. All totaled, the internal memory port could support up to 2.9 GB/s of bandwidth.

Because the TMS32OC80 TC included only a single set of PT processing registers, all PTs had to use them. Once a PT had begun, future requests were blocked until that PT was complete. To deal with this 'in-order blocking' issue, the TC instituted a mechanism known as suspension, where an active PT could be stopped in favor of something of higher priority, and then automatically restarted once the higher priority transfer completed. Because the TC relied on a memory mapped set of 'link list pointers' to manage all PT requests, it was simple for the TC to suspend a transfer by copying the parameters in the TC registers back to that referenced address to perform the suspension. This ability to reuse a single set of registers for all transfers in the system was the single most important difference between the TC and a traditional DMA.

The TMS320C80 TC, despite being very flexible, has a number of deficiencies. The key issue with the architecture are that it was very complex. Over the history of the TMS320C80 TC, the external memory interface changed in four of the five major device revisions. Because the TMS320C80 TC also provided the external memory interface, it was altered significantly from one revision to the next. This inherently opened up new and unknown timing windows with each revision, resulting in a large number of device errata. The internal crossbar was also a key limit to speed.

A final key issue with the TMS320C80 TC was the support of suspension of transfers. This mechanism allowed transfers which were in progress to be halted, their parameters written back to memory, and a new transfer started automatically. While an excellent programming and use model, the process of copying back and rereading parameters was problematic. Many timing windows existed during which transfers needed to be locked out, a virtual impossibility in a real time data streaming system.

SUMMARY OF THE INVENTION

The transfer controller with hub and ports TCHP of this invention is an interconnection network which assumes the task of communication throughout the processor system and its peripherals in a centralized function. Within the TCHP, a system of one hub and multiple ports tied together by a common central pipeline is the medium for all data communications among DSP processor nodes, external devices, and external memory. This includes communication between two or more DSP nodes as the DSP node does not have direct access to the memory of each other DSP node.

FIG. 3 illustrates the basic principal features of the TCHP. The TCHP is basically a data transfer controller which has at its front end portion, a request queue controller 300 receiving, prioritizing, and dispatching data in the form of transfer request packets. The request queue controller 300 connects within the hub unit 310 to the channel registers 320 which receive the data transfer request packets and processes them first by prioritizing them and assigning them to one of the N channels each of which represent a priority level. These channel registers interface with the source 330 and destination 340 pipelines which effectively are address calculation units for source (read) and destination (write) operations.

Outputs from these pipelines are broadcast to M Ports (six shown in FIG. 3 as 350 through 355) which are clocked either at the main processor clock frequency or at a lower external device clock frequency. Read data from one port, e.g. port 350, having a destination write address of port 353 is returned to the hub destination control pipeline through the data router unit 360.

The TCHP can be viewed as a communication hub between the various locations of a global memory map. In some systems having multiple DSP processor nodes, each such node has direct access only to its locally allocated memory map. In the system of this invention, any access outside of a DSPs local space is accomplished exclusively by a TCHP directed data transfer.

The various types of data transfers supported by the TCHP are:
1. Direct Memory Access (DMA):
    Data Transfer explicitly initiated by a program instruction being executed from a DSP processor node.
2. External Direct Memory Access (XDMA):
    Data Transfer explicitly initiated by an autonomous external device.
3. Long Distance Transfer:
    Load/Store operations outside of a DSPs local memory space.
4. Data Cache (DC) Transfer:
    Data cache miss-fill/writeback request from a DSP processor node.
5. Program Cache (PC) Transfer:
    Program cache miss-fill request from a DSP processor node.

In summary, the TCHP of this invention is a highly parallel and highly pipelined memory transaction processor, which serves as a backplane to which many peripheral and/or memory ports may be attached. The TCHP provides many features above and beyond existing DMA and XDMA controllers, including support for multiple concurrent accesses, cycle-by cycle arbitration for low turnaround, and separate clocking of all ports asynchronous to the main processor clock.

BRIEF DESCRIPTION OF THE DRAWINGS

FIG. 6 illustrates the generic address unit block diagram of the TCHP of this invention, which is used to calculate source/destination addresses, word count and line count within the source/destination pipeline units;

FIG. 7 illustrates the queue manager functional block of this invention, where transfer requests are received, prioritized and placed in a queue;

DETAILED DESCRIPTION OF THE INVENTION

Figure 1:
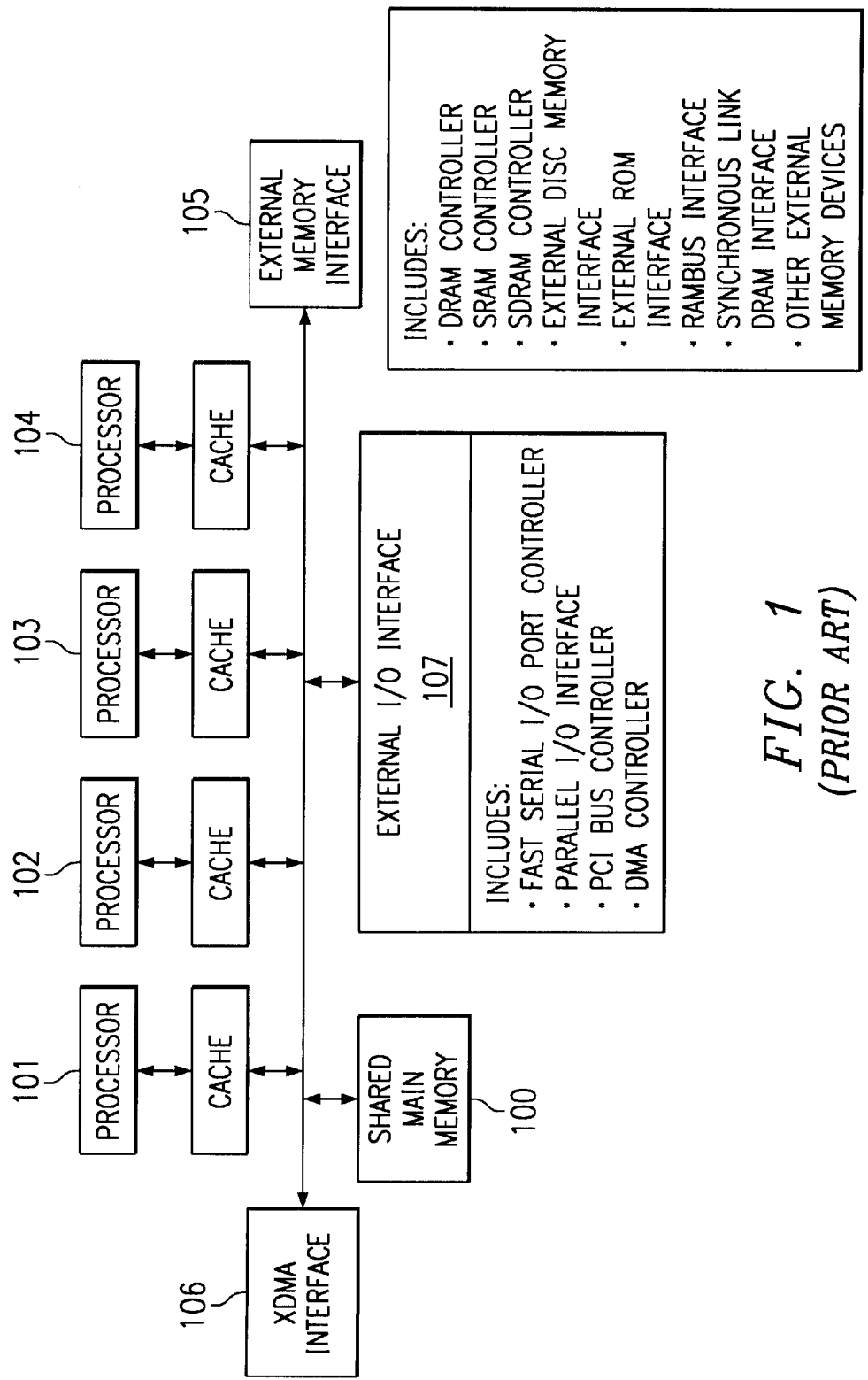
FIG. 1 illustrates a central shared memory multi-processor machine (Known Art)
Figure 2:
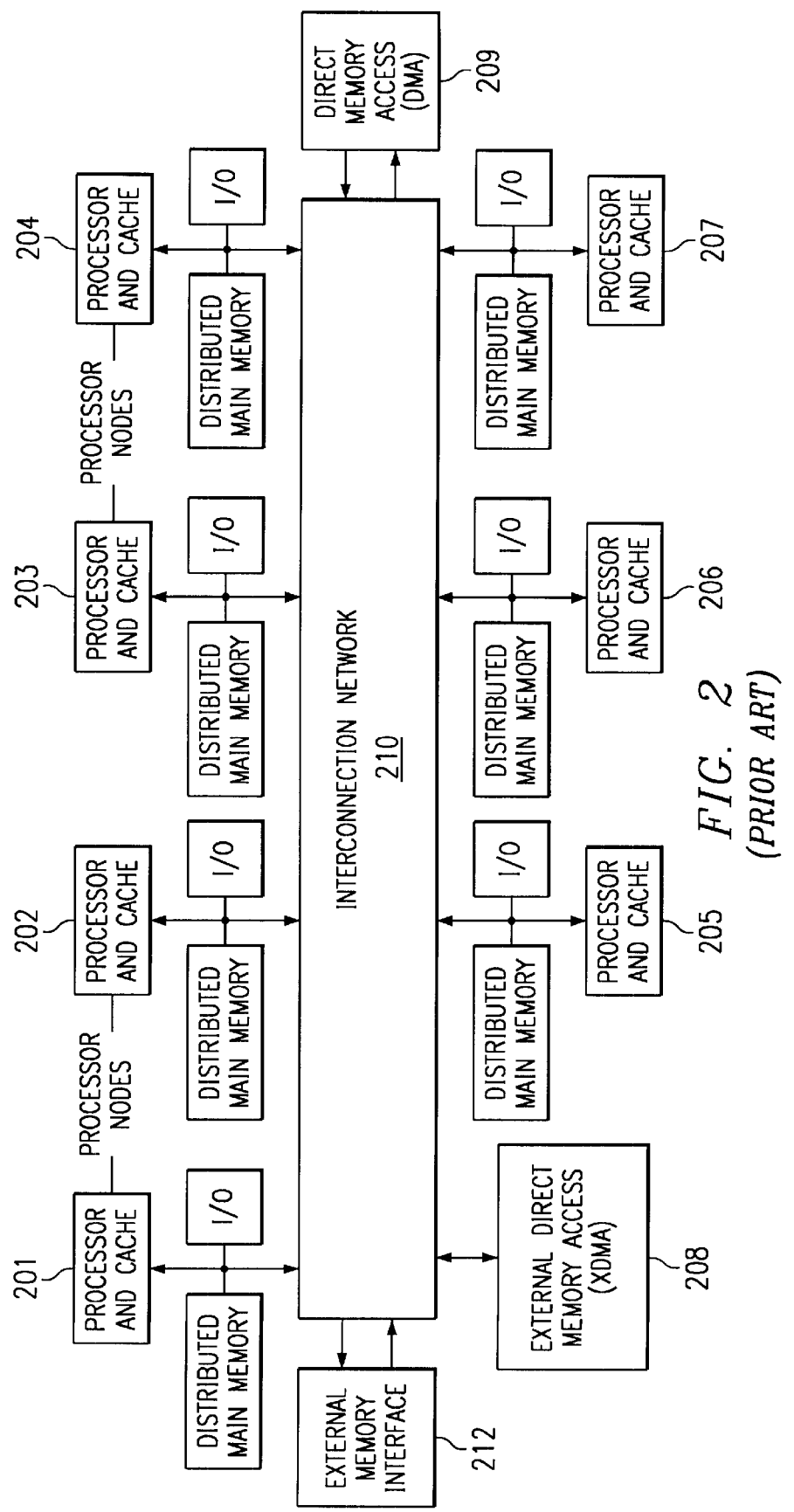
FIG. 2 illustrates a distributed memory multi-processor machine (Known Art)
Figure 3:
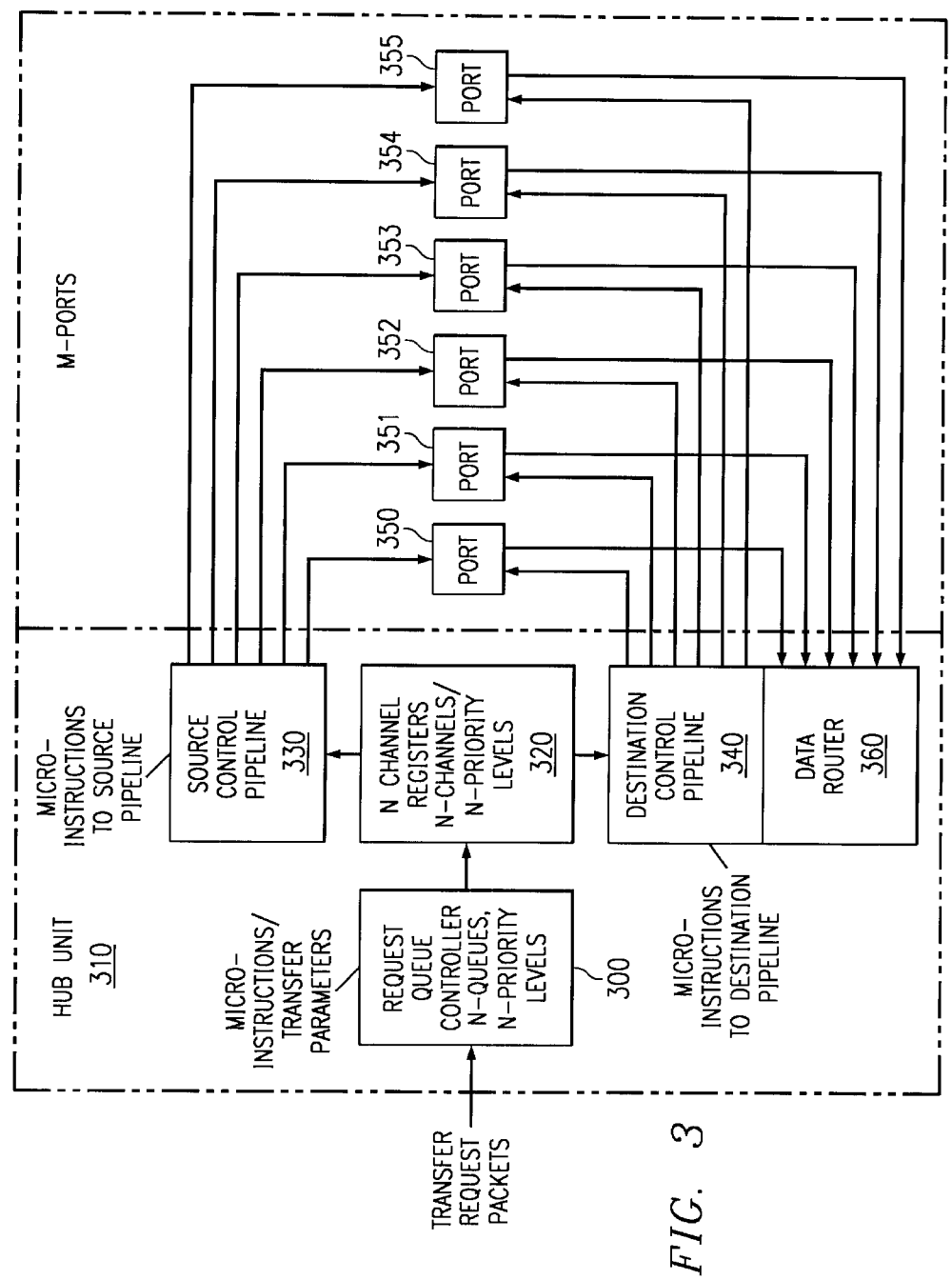
FIG. 3 illustrates in a functional block diagram the basic principal features of the TCHP of this invention.

The TCHP and its closely associated functional units, may be broken into five main entities (refer to FIG. 4):

1. The request bus master 400 input which takes in transfer request packets from the transfer request feed mechanism 401, these transfer requests originating from processor elements or other devices. These transfer request packets are input to the queue manager 420 which is within the TCHP. A transfer request is a command (in the preferred embodiment the command word is of quad word length or double long word length i.e. approximately 128 bits in length) to the TCHP to move a specified number of data elements from one global address to another.

2. The TCHP, shown within the dashed line of FIG. 4, includes queue manager 420, dual port RAM 425 queue storage, and the hub engine 435 with channel registers 439, source/destination pipelines and routing unit 449. The dashed line disects the external ports interface units, indicating that the THCP proper, terminates within these ports. The hub engine 435 performs the servicing of the transfers, breaking them into smaller transfers that the devices can handle.

3. The internal memory port (IMP) node master 450, which is viewed as a special TCHP port, interfaces to the data transfer bus (DTB) 455 which connects the port representing internal memory to the processor nodes. Processor nodes interfaces here include all distributed internal data memory and internal program memory controllers and to all the other control registers on the processor system.

4. The data transfer bus (DTB) 455, another associated TCHP unit, connects the port representing internal memory to the memory interfaces in the DSP processor nodes and other units in the core of the chip.

5. The external ports interfaces 440 through 447 which act as a buffer between the hub engine and the external memory or peripheral port.

The TCHP of this invention is applicable in general to complex systems whether or not multiple DSP processor nodes are used. The ability to place in queue, data transfer requests from multiple sources and to service them while interfacing with multiple external interfaces, including external memory, with efficient control of priorities, is an added advantage which the transfer controller concept of this invention makes possible. In a general sense, the transfer controller of this invention handles multiple 'transfer requesters' whether these be DSP processor nodes, central processor units (CPU) or other generic functional blocks requiring data transfers.

The TCHP of this invention introduces several new ideas supplanting the older TMS320C80 TC philosophy.

1. First, it is uniformly pipelined. In the previous TC designs, the pipeline was heavily coupled to the external memory type that was supported by the device. In the preferred embodiment, the TC contains multiple external ports, all of which look identical to the TC hub, such that peripherals and memory may be freely interchanged without affecting the TC.

2. Secondly, the TCHP now has the concept of concurrent execution of transfers. That is, up to N transfers may occur in parallel on the multiple ports of the device, where N is the number of channels in the TCHP core. Each channel in the TCHP core is functionally just a set of registers, which tracks the current source and destination addresses, as well as word counts and other parameters for the transfer. Each channel is identical, and thus the number of channels supported by the TCHP is highly scaleable.

3. Thirdly, the TCHP includes a mechanism for queuing transfers up in a dedicated queue RAM. In earlier devices of known TC art (e.g. TMS320C80), the rule was one transfer outstanding per processor at a time. Through the queue RAM, processors may issue numerous transfer requests before stalling the DSP.

4. The fourth key element which the new TCHP provides is support for write driven processing. Most DMAs and TMS320C80 style TC designs rely on read driven processing:

In read driven processing, in a memory move the read access regulates the operation, since the writes can obviously not occur until read data returns. Likewise, if the destination to which the writes are to be performed is very slow (say a peripheral) in comparison to the source, then the source is held up by the writes. This can be very inefficient, particularly if the source is main memory, which all processors and peripherals rely upon. To maximize use of faster memory ports, the TCHP institutes what is referred to as write driven processing.

The basic TCHP architecture includes two pipelines, referred to as source and destination (SRC and DST). Each pipeline is functionally identical, in that it contains logic for performing six logical functions. These are:

| Pipeline Stage Letter Designation | Function |
| --- | --- |
| Q | Interrogates the state of the queues within the ports |
| M | Map port ready signals to channels |
| P | Prioritize highest priority channel whose ports are ready |
| A0 | ½ Address update cycle |
| A1 | $2^{nd}$ ½ Address update cycle |
| C | Issue command to ports |

The six stages above represent LOGICAL operations which must be performed by each pipeline. The LOGICAL states may be mapped to PHYSICAL pipeline stages in any number of cycles. One early device which utilized the TC concept included 6 PHYSICAL stages, one for each LOGICAL state. Another device included just 3 PHYSICAL stages, allowed by the reduced clock frequency requirement for that device. Other numbers of PHYSICAL stages are allowed as well with no architectural change to the TC. This feature makes the TC HUB highly scaleable to a wide range of frequencies.

The source (SRC) pipeline is responsible for issuing read and pre-write commands. Read commands are straightforward, pre-write commands are used to reserve space in a write reservation station as described above.

The destination (DST) pipeline is responsible for issuing write command only, but also interfaces with a module referred to as the routing unit. Functionally, the routing unit is a fully orthogonal crossbar, connecting all ports to one another. However, unlike normal crossbar, the routing unit is part of the TCHP pipeline,. and thus isnt a speed limitation as it was on the TMS320C80 and other crossbar architectures.

The two pipelines can operate independently of one another, and thus a single read and write command can be issued on every cycle. Commands are issued to the ports in what are referred to as 'bursts'. A burst size is determined by the type of memory or peripheral that the port interfaces to. The 'default burst size', or what the TC tries to optimize accesses to, is determined by a tie-off at each port interface. By doing this, the TCHP is isolated from knowing what type of memory or peripheral is attached to each port. Because commands are issued for 'bursts' or words at a time (generally, bursts are one to eight 32-bit words in length) and will take multiple peripheral cycles to complete, multiple accesses can be posted to the ports at a time. Each port interface includes buffering to catch landing read data, and buffer outgoing write data while a burst packet is formed.

These buffers physically reside in what are referred to as EPIU, or external port interface units. The EPIUs are physically part of the TCHP, though outside of the pipelines. The EPIU interface to the TC HUB is identical for all ports. The EPIUs in turn provide a uniform interface to the peripherals and memory, such that modules can be developed for a Plug-n-Play interchangeable model. One other function of the EPIU buffers is synchronization. Because the buffers are physically FIFOs, the peripheral side of the EPIU may operate completely asynchronous to the TC hub. In fact, each port in the TCHP may operate asynchronously to one another and to the TC HUB. This feature makes the TCHP highly scaleable, as it is not tied to any one particular memory or peripheral interface, nor is it tied to a specific clock frequency.

Requests are made to the TCHP via a functional device referred to as the transfer request feed mechanism TRFM. This functional device, in accordance with the rest of the TCHP concept, is highly scaleable. The transfer request parameters for a transfer are passed to the TCHP. The parameters include information about the source, destination, and any special addressing modes which should be used to perform the transfer. Requesters of the TCHP typically include one or more DSP processors, an XDMA controller, and possibly external peripherals.

The TCHP of this invention has the following attributes which form the basis for the claims to be made in this invention:

1. The TCHP is an engine for atomizing macro transfer requests, breaking them up into a number of micro transfers request components of the most efficient size and make-up. The core of the TCHP is the TC Hub which is independent of the physical interfaces over which the data is to be transferred, i.e. the ports.
2. The interface to the ports is standard and parameterized, providing greater flexibility
3. Port frequency and hub frequency are independent.
4. The TCHP interconnection network has sufficient bandwidth that it does not limit multiprocessor system performance. The overall multiprocessor system performance is limited only by the bandwidth of the I/O ports.
5. Multiple requests can be processed concurrently ensuring the available bandwidth is utilized as effectively as possible.
6. DMA control is a central resource and is not duplicated in each processor node.
7. Priority and scheduling is set to service all ports and is determined by the principle that no port or channel can stall data flow progress at all other ports. Each channel has a unique and constant priority.
8. A whole cycle is allocated for communicating between the TCHP and any port, allowing for scalability without encountering the severe signal delay performance penalties normally associated with increased complexity.
9. Transfer requests at each priority level start and complete in the order in which they are queued for that port.
10. Transfers are non-blocking and are never suspended. The transfer running in a channel completes (or causes an error) before any other transfer runs in that channel.
11. TCHP architecture allows for a large number of transfer requests to be issued to the queue manager RAM, this number not being limited by the fixed number of channel registers.
12. The number of outstanding transfer requests is limited only by the size of the queue manager RAM.
13. The pipelined nature of the TCHP architecture allows scalability which is not possible in other data-flow based data transfer architectures.
14. Transfers are non-blocking. This attribute follows simply from the fact that a transfer from port A to port B cannot be blocked by congestion arising from another transfer from port A to port C.

Figure 4:
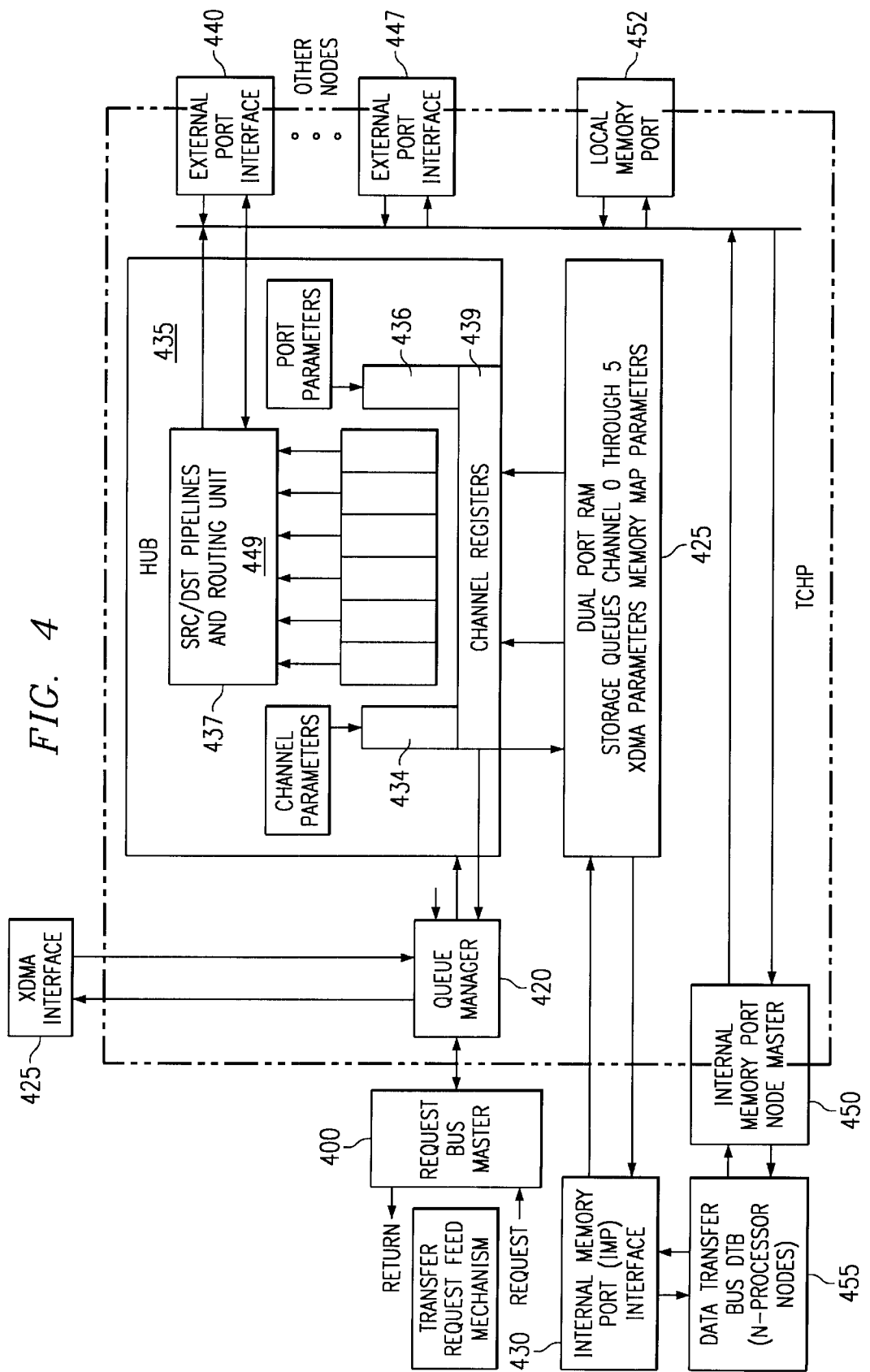
FIG. 4 illustrates the transfer controller with hub and ports architecture, the detailed functional block of this invention (TCHP) along with its closely associated functional units, as originally described.

The TCHP (as originally described) is shown FIG. 4. This drawing shows the major functional blocks of the TCHP, but does not highlight the multiple data transfer bus nodes 455 and their separate accesses to the transfer request bus. FIG. 4 also separates the queue manager from the hub engine, but these two units, which closely interact, have become commonly combined, in later nomenclature, into one unit referred to as the 'TCHP hub'.

Figure 5:
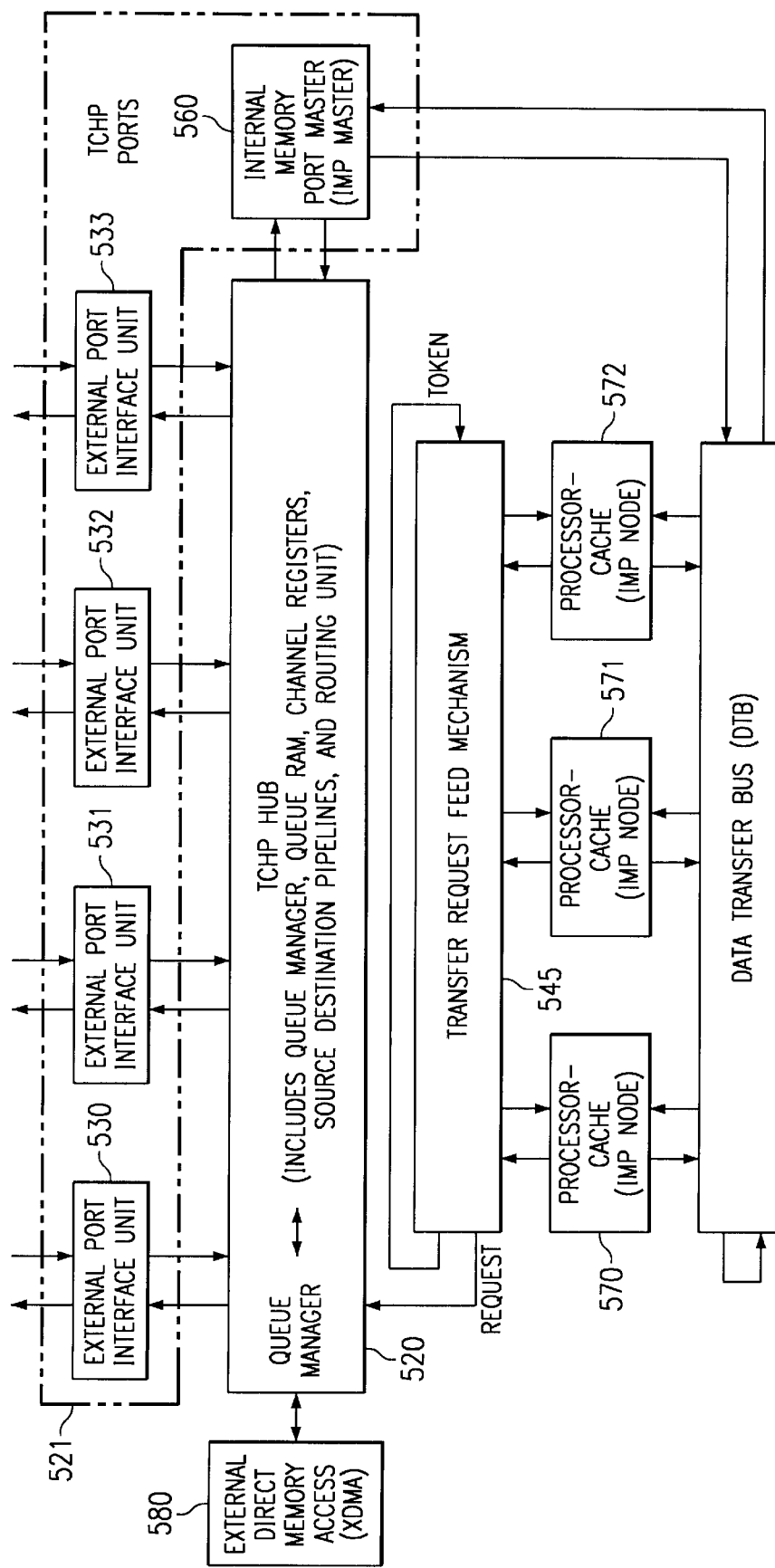
FIG. 5 illustrates the Multi-Processor Machine with Transfer Controller with HUBs and Ports Architecture TCHP functional block of this invention, showing from a higher level, the essential elements of the Transfer Controller TCHP and its associated functional units. The elements of the invention are the queue manager and the TCHP hub. The associated units are the transfer request feed mechanism, the data transfer bus, and the external port interface units.

FIG. 5 shows from a higher level, the interconnection of the four main functional blocks, the first two of which, the TCHP hub 520 and the ports 521 (including all ports interface composed in FIG. 5 of 530, 531, 532, 533 and 560). The TCHP hub 520 and the ports 521 are an integral part of the TCHP. The other two units, the transfer request feed mechanism 545 and the data transfer bus DTB 555 are closely associated functional units, but not a part of the TCHP itself. FIG. 5 highlights the possible connection multiple data transfer bus DTB nodes and the possible connection of multiple transfer request nodes.

Address Generation

Address and word count are required outputs of each address unit and these outputs update the selected channel, given the size of the transfer to be performed. The complexity of address generation within the TCHP is increased by the need to accommodate the following transfer options which are of two major types:

1. Normal Linear transfers, and
2. two dimensional (2-D) transfers.

Normal linear transfers are simple single word or one dimensional (1-D) word transfers. These have address generation which proceeds in a straight forward fashion as illustrated in FIG. 6 as a generic address generator.

Source address/word count calculation unit includes source base address register 600, source transfer size (interval) address register 601, source word count base register 602. Source address adder 603 calculates next source address by adding source base address register 600 to source transfer size (interval) address register 601 and storing sum in source address base register 600.

Source word count adder 604 calculates remaining word count by subtracting transfer size register 601 from word count base register 602, and storing difference in source word count base register 602.

Destination address/word count generator includes the same basic hardware and operates in like manner.

Destination address/word count calculation unit includes destination base address register 600, destination transfer size (interval) address register 601, destination word count base register 602. Destination address adder 603 calculates next destination address by adding destination base address register 600 to destination transfer size (interval) address register 601 and storing sum in destination address base register 600.

Destination word count adder 604 calculates remaining word count by subtracting transfer size register 601 from word count base register 602, and storing difference in destination word count base register 602.

Two dimensional (2-D) transfers are transfers of a number of identically sized lines, the length of each line, number of lines, and first word offset values defined by 'word count', 'line count', and 'line pitch' parameters, respectively. Two dimensional (2-D) transfers have the following permutations:

1. on-chip 1-D to off-chip 2-D memory transfers;
2. off-chip 2-D to on-chip 1-D memory transfers;
3. off-chip 2-D to off-chip 2-D transfers.

In 2-D transfers the channel performs patch adjust cycles the size input becomes instead a 'line pitch' 611 and the word count becomes a 'line count' 612. Line count decrement uses adder 604 with −1 as the left-most input 614. The sizer unit 605 also has additional hardware to accommodate the additional parameters and operations involved in the 2-D transfer.

TCHP Core Sub-blocks

Figure 8:
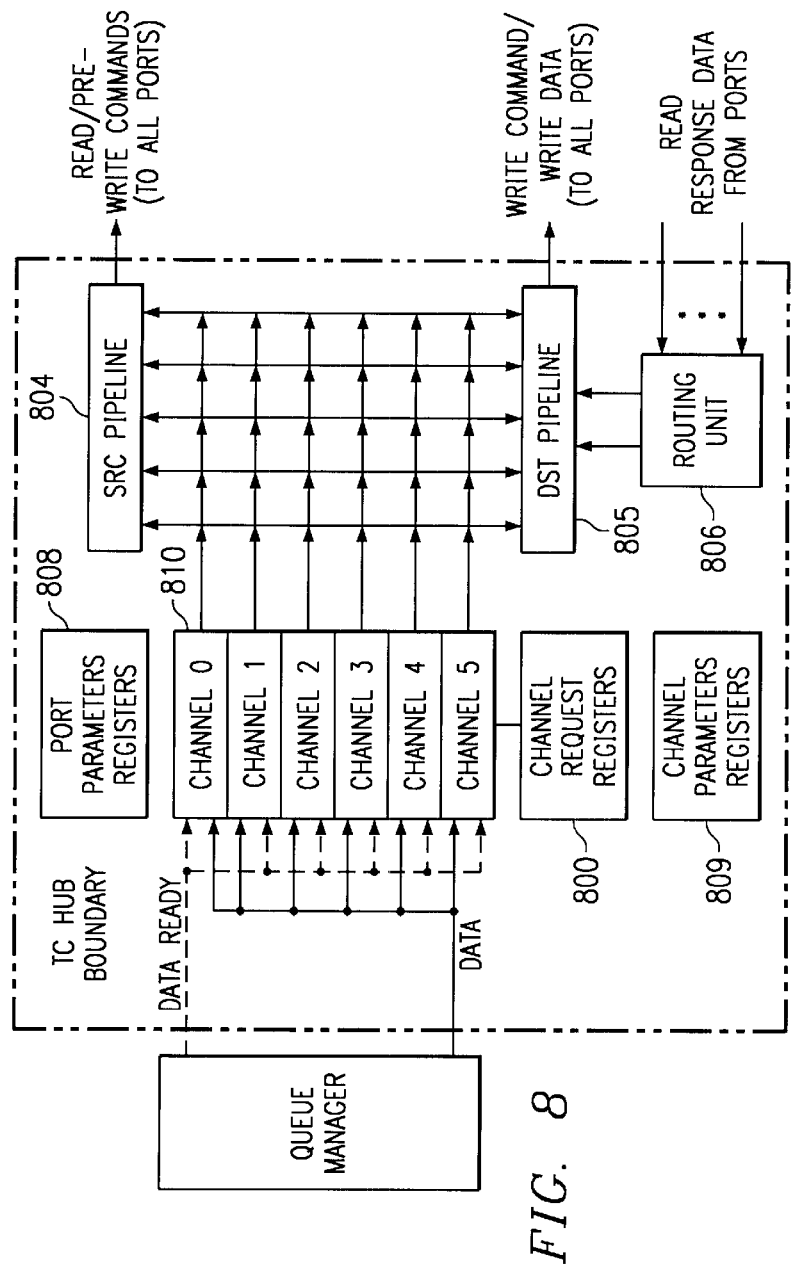
FIG. 8 illustrates the TCHP of this invention, which contains the queue manager and the hub engine which comprises channel request registers, port parameters registers, channel parameters registers, source and destination pipelines, and routing unit.

The TCHP is broken into two main parts, the queue manager sub-block illustrated in FIG. 7 and the TCHP hub sub-block illustrated in FIG. 8. These sub-blocks may be further broken down into:

TCHP Core Sub-Blocks
Queue manager sub-block (FIG. 7)

1. Queue manager request bus master (701);
2. Queue manager control (701);
3. Queue manager write/read pointers 703);
4. Queue manager dual port RAM queue storage with requester disable (702).

TCHP hub sub-block (FIG. 8)

5. channel registers (800, 809);
6. source address pipeline (804);
7. destination address pipeline (805);
8. routing unit (806).

The TCHP hub sub-block performs the bulk of the servicing of the transfers. Because the TCHP operates at the internal processor core clock frequency, its bandwidth is expected to be much larger than that for the external memories, and a single transfer between internal and external memory would result in only a fraction of the full potential of the TCHP bandwidth.

The TCHP prioritizes between the channels, and processes them one at a time, allowing the sums of the bandwidths of the memories to utilize the full TCHP bandwidth. Also, in order to not stall the TR bus (and therefore the transfer requesters), the TCHP queues up multiple requests for each channel and starts to service a request as soon as possible after enqueueing. While a given request is being processed by the TCHP hub engine, subsequent requests can be enqueued.

In FIG. 7, the queue manager request bus master and control unit 701 performs the queuing of transfer requests and prioritizing them until they can be serviced by the TCHP hub engine. The dual port RAM storage queues 702 hold the current transfer parameters for the requests currently being serviced in the TCHP hub engine.

In FIG. 8, the channel request registers 800 receive individual requests from the queue manager dual port RAM. The source address pipeline 804 performs the servicing of source port read requests for the transfers. And similarly, the destination address pipeline 805 performs the servicing of destination port write requests (with the associated read data) for the transfers.

The source pipeline 804 and the destination pipeline 805 are each comprised of multiple stages (six in the preferred embodiment) which carry out the servicing of transfer requests in the following stages:

| Pipeline Stage | Function |
| --- | --- |
| Q | Transport delay for queue information from ports to the TCHP hub engine. This is to allow for long wire delays from ports to the TCHP hub engine. |

-continued

| Pipeline Stage | Function |
| --- | --- |
| M | Maps available ports to channels open for processing based on local queue counters. |
| P | Prioritizes between channels and decrement selected channel's used port's associated local queue counter. |
| A0 | Read address/size registers and start computations. For secondary destination operations, a signal must be sent to the response queue to request the data. |
| A1 | Complete computations and write results. For secondary destination operations, the data requested from the response queue must be registered in the routing unit. |
| C | Issue command (and data if secondary destination operation) to queue provided command is not annulled. If command is annulled, the queue counter is incremented to reinstate the unsent command. |

The routing unit 806 of FIG. 8, takes in read response data from the individual ports and provides this information to the pipeline 805 so that alignment on the write data may be performed.

Internal Memory Port Master Interface

The internal memory port (IMP) 450 master interface to the data transfer bus (DTB) 455 shown in FIG. 4, connects the port representing internal memory to the processor nodes and other devices accessing the data transfer bus at the various DTB nodes. Processor nodes interfaces here include all distributed internal data memory and internal program memory controllers and to all the other control registers on the processor system. These include:

1) Local memory of any data memory controller or program memory controller of any processor node on the chip.
2) Control registers of any data memory controller or program memory controller of any processor node on the chip.
3) XDMA parameter memory
4) XDMA control registers
5) Queue manager control registers
6) Queue manager data memory The data memory controllers (DMC) and the program memory controllers (PMC) service requests for data accesses and instruction fetches respectively from a DSP. They are part of the DSP cluster and there is one DMC and one PMC associated with each DSP.

The XDMA controller is triggered by on-chip or off-chip events to generate transfer requests on the TR bus. When an event is raised, the transfer request; associated with that event is placed onto the TR bus.

The queue manager 420 receives and stores all transfer requests from the transfer request feed mechanism 401. The priority of the transfer request is used to queue it for the channel which processes requests of that priority. When a channel becomes free, the TCHP hub engine requests another queue entry from the queue manager. The queue manager responds by sending a transfer request of the proper priority level for that channel.

Referring again to FIG. 4, the internal memory port IMP node master 450 unlike the external port interface units EPIU 440 through 447 and local memory port 452 of FIG. 4 does not require a storage of write requests. This is because the IMP operates at the main processor clock frequency and has no need to interface with a slower operating external device. Write request storage is necessary in the EPIU only on slow ports to prevent occurrence of blockages.

External Port Interface Units (EPIU)

Figure 9:
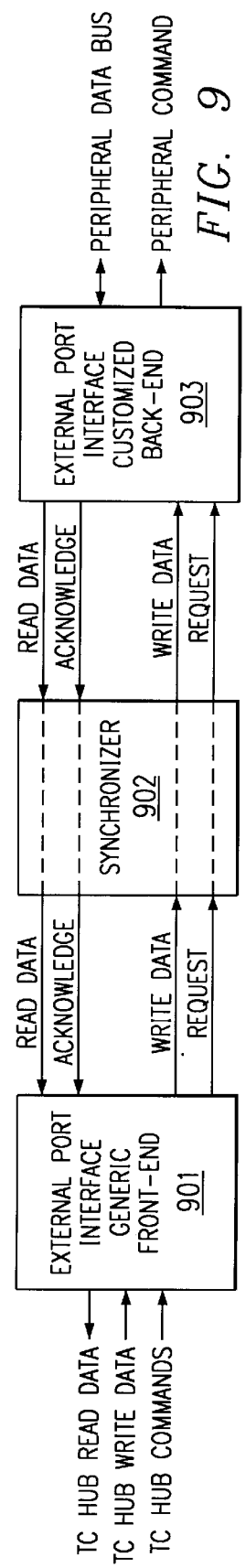
FIG. 9 illustrates the TCHP external port interface unit (EPIU) block of this invention, which acts as a buffer between the TCHP hub engine and the memory or peripheral port.

The external port interface units actually interface between the TCHP hub engine and the external device or memory. This allows the TCHP hub engine to be made independent of which external devices are used, and only the back-end of the EPIU will change with each peripheral. FIG. 9 is a high level block diagram of the EPIU structure.

The generic front-end 901 of the EPIU accepts the read and write commands from the TC Hub in transfer sizes that match to the peripheral. The EPIU contains some small queues to hold multiple requests (read or write) so that the peripheral can remain busy even when waiting for the TC Hub to respond. The back-end 903 of the EPIU interfaces with the I/Os of the peripheral (whether an internal block or I/O pins). The back-end 903 then must operate at the peripheral frequency, so the communication between the front-end 901 and the back-end 903 must be synchronized by the synchronizer 902.

Back-end external port types with customized features are envisioned with the following types as possibilities:

Back-End External Port Types:

1) RAMBus DRAM controller;
2) PCI bus controller;
3) 1394 FireWire controller;
4) fast serial port controller;
5) SLRAM (SyncLink DRAM controller);
6) SDRAM controller;
7) SRAM controller;
8) Other system bus.

The TCHP hub services transfer requests to move data words between ports. Each external port connects to an I/O bus or I/O device. The TC hub communicates with the external port through three queues and a 'reservation station'. Some ports do not implement all three queues. but instead omit the reservation station. The queues are:

1) Command queue (CQ) which holds read commands from the TC Hub.
2) Write queue (WQ) which holds write commands from the TC Hub.
3) Response queue which holds responses to commands (e.g. read data).
4) Write reservation station which is used in ports with slow destination devices.

For slow destination devices, the TCHP hub uses write driven processing. When a transfer has a slow destination port, the TCHP hub only sends read commands to the source port when the destination port has write reservations to hold them. When the destination write reservation station is full, the TCHP hub sends no more read commands to the source port.

A port must provide configuration information (port parameters) to the TCHP hub so that the TCHP hub can be a design fixed for many combinations of ports. This gives the design a 'reusable' feature which is extremely valuable in bringing new products to market with a low design cycle time.

Some of the configuration information ports provide to the TCHP hub are:

1) Information that there is indeed a port 'Present'
2) Queue Depth for each queue and for reservation station.
3) Burst Size 4) Write-driven (vs read-driven) when used as a destination.

5) Command Queue (CQ) which holds commands from the TC Hub.

This completes the description of the elements of the TCHP of this invention. This transfer controller architecture is a fundamental concept which greatly clarifies the implementation of an extremely wide variety of single processor and multi-processor devices. Complete flexibility is established to allow hew product designers to customize choices of types and number of all internal and external interface units with a protocol capable of clearly defining the mechanism by which the wide variety of data transfers required is to be accomplished.

What we claim is:

1. A data transfer controller comprising.
   a request queue controller capable of receiving, prioritizing and dispatching data transfer requests each specifying a data source, a data destination and a data quantity to be transferred;
   a data transfer hub connected to the request queue controller for receiving dispatched data transfer requests;
   a plurality of ports, each port having an interior interface connected to the data transfer hub which is the same for each port and an exterior interface configured for an external memory/device which, in operation, is connected to said port, the interior interface and the exterior interface being connected for data transfer therebetween; and
   the data transfer hub being capable of controlling data transfers from a source port corresponding to the data source to a destination port corresponding to the data destination in quantities corresponding to the data quantities to be transferred under a currently executing data transfer request.

2. The data transfer controller of claim 1, wherein:
   said data transfer hub and said interior interface of each of said plurality ports are clocked at first common frequency;
   said exterior interface of each of said plurality of ports is clocked at a second frequency corresponding to external memory/device expected to be connected to said port, said second frequency of at least one of said plurality of ports being asynchronous with said first common frequency.

3. The data transfer controller of claim 1, wherein:
   said data transfer hub includes a plurality of data channels, each data channel having a source address calculation unit, a destination address calculation unit and a data first-in-first-out buffer, said data transfer hub controlling
      reading of data by supply of a source address calculated by said source address calculation unit to said source port and supplying data read from said source port to an input of said data first-in-first-out buffer, and
      writing of data by supply of a destination address calculated by said destination address calculation unit to said destination port and supplying data to be written to said destination port from an output of said data first-in-first-out buffer.

4. The data transfer controller of claim 3, wherein:
   said data transfer request specifies a data source by specifying a source base address, a source interval and a source word count; and
   said source address calculation unit includes
      a source base address register initially loaded with said source base address,
      a source interval address register initially loaded with said source interval,
      a source word count register initially loaded with said source word count,
      a source address adder connected to said source base address register and said source interval address register, said source address adder calculating a next source address by adding data stored in said source base address register to data stored in said source interval address register and storing said next source address in said source base address register, and
      a source word count decrementer connected to said source word count register decrementing said word count stored in said source word count register for each calculated next source address, said data transfer hub ending data transfer in response to a data transfer request when said source word count stored in said source word count register has decremented to zero.

5. The data transfer controller of claim 3, wherein:
   said data transfer request specifies a data destination by specifying a destination base address, a destination interval and a destination word count; and
   said destination address calculation unit includes
      a destination base address register initially loaded with said destination base address,
      a destination interval address register initially loaded with said destination interval,
      a destination word count register initially loaded with said destination word count,
      a destination address adder connected to said destination base address register and said destination interval address register, said destination address adder calculating a next destination address by adding data stored in said destination base address register to data stored in said destination interval address register and storing said next destination address in said destination base address register, and
      a destination word count decrementer connected to said destination word count register decrementing said word count stored in said destination word count register for each calculated next destination address, said data transfer hub ending data transfer in response to a data transfer request when said destination word count stored in said destination word count register has decremented to zero.

6. The data transfer controller of claim 1, wherein:
   said data transfer hub includes a plurality of data channels, each data channel having a source address calculation unit, a destination address calculation unit and a data first-in-first-out buffer, said data transfer hub controlling
      reading of data by supply of a source address calculated by said source address calculation unit to said source port and supplying data read from said source port to an input of said data first-in-first-out buffer,
      writing of data by supply of a destination address calculated by said destination address calculation unit to said destination port and supplying data to be written to said destination port from an output of said data first-in-first-out buffer until said data quantity specified in said data transfer request has been transferred, whereupon said data channel is open;
   said data transfer requests each have a priority within a hierarchy of priorities;
   said request queue controller dispatching data transfer requests to an open data channel of said data transfer hub in priority order from highest to lowest priority within said hierarchy of priorities and within each priority level from a first received data request to a last received data transfer request.

7. The data transfer controller of claim 6, wherein:

said data transfer hub controlling a data transfer request until said data transfer request completes or generates a fault once assigned to a data channel.

8. The data transfer controller of claim 6, wherein:

said request queue controller includes a request queue memory storing data transfer requests upon receipt prior to dispatch, said request queue memory having a data capacity to store more data transfer requests than a number of data channels of said data transfer hub.

9. A data processing system comprising:

a plurality of data processors, each data processor being capable of generating a data transfer request;

a request queue controller connected to the plurality of data processors for receiving, prioritizing and dispatching data transfer requests each specifying a data source, a data destination and a data quantity to be transferred;

a data transfer hub connected to the request queue controller for receiving dispatched data transfer requests;

a plurality of ports, each port having an interior interface connected to said data transfer hub which is the same for each port and an exterior interface configured for an external memory/device which in operation is connected to the port, the interior interface and said exterior interface being connected for data transfer therebetween; and the data transfer hub being capable of controlling data transfers from a source port corresponding to the data source to a destination port corresponding to the data destination in quantities corresponding to the data quantities to be transferred under a currently executing data transfer request.

10. The data processing system of claim 9, wherein:

each of said data processors, said data transfer hub and said interior interface of each of said plurality ports are clocked at first common frequency;

said exterior interface of each of said plurality of ports is clocked at a second frequency corresponding to external memory/device expected to be connected to said port, said second frequency of at least one of said plurality of ports being asynchronous with said first common frequency.

11. The data processing system of claim 9, further comprising:

a system memory connected to a predetermined one of said plurality of ports; and wherein each of said data processors includes a program cache for temporarily storing program instructions controlling said data processor, said data processor generating a data transfer for program cache fill from said system memory upon a read access miss to said program cache.

12. The data processing system of claim 9, further comprising:

a system memory connected to a predetermined one of said plurality of ports; and wherein each of said data processors includes a data cache for temporarily storing data employed by said data processor, said data processor generating a data transfer for data cache fill from said system memory upon a read access miss to said data cache.

13. The data processing system of claim 9, further comprising:

a system memory connected to a predetermined one of said plurality of ports; and wherein each of said data processors includes a data cache for temporarily storing program instructions, said data processor generating a data transfer for data writeback to said system memory upon a write miss to said data cache.

\* \* \* \* \*